June 2, 1931.  A. P. ARMINGTON  1,808,446
ENDLESS TREAD LINKAGE
Filed July 1, 1929  2 Sheets-Sheet 1
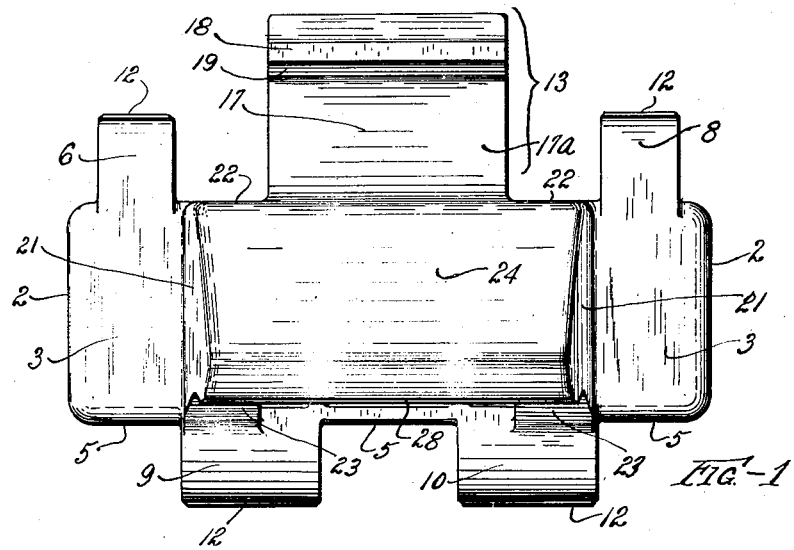
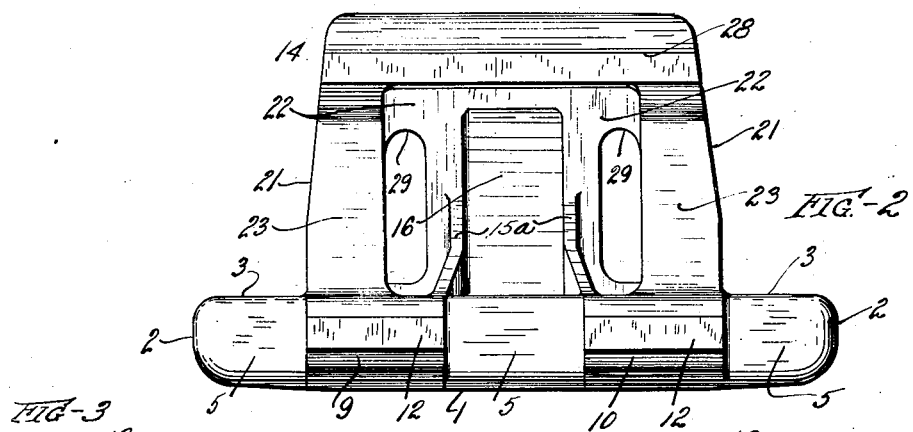
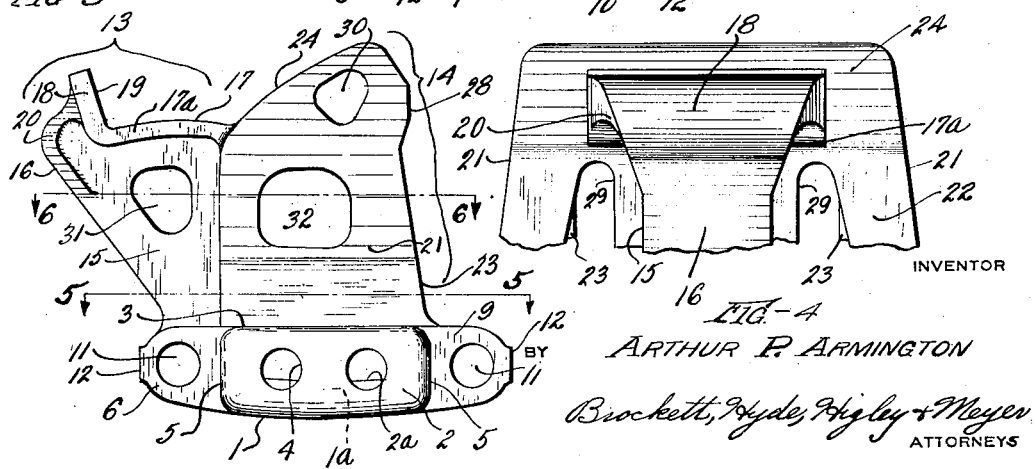
INVENTOR
ARTHUR P. ARMINGTON
BY Brockett, Hyde, Higley & Meyer
ATTORNEYS June 2, 1931. A. P. ARMINGTON 1,808,446
ENDLESS TREAD LINKAGE
Filed July 1, 1929  2 Sheets-Sheet 2
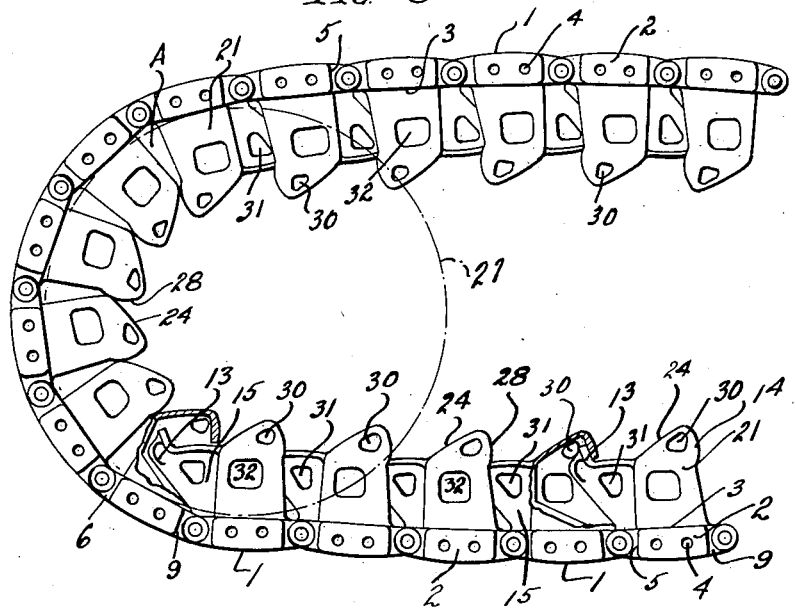
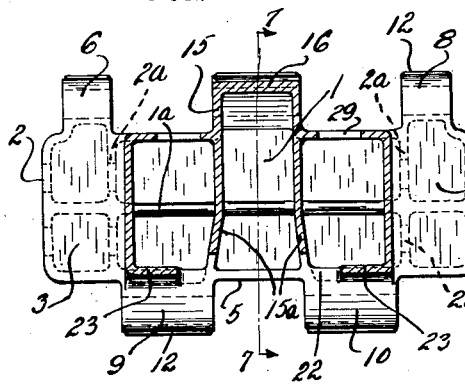
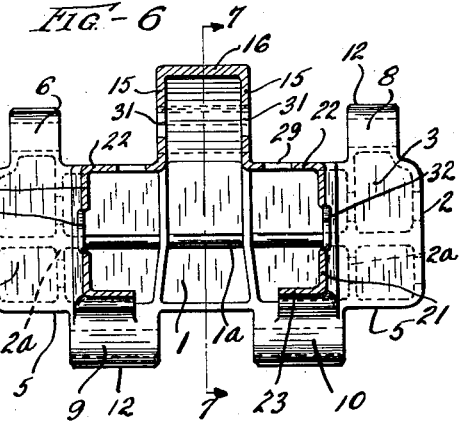
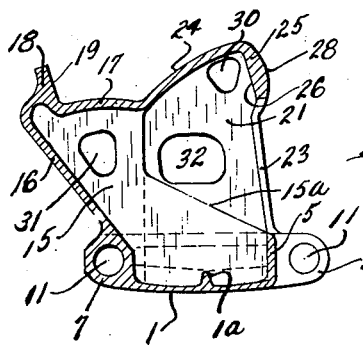
INVENTOR
ARTHUR P. ARMINGTON
BY
Brockett, Hyde, Higley & Meyer
ATTORNEYS Patented June 2, 1931

1,808,446

UNITED STATES PATENT OFFICE

ARTHUR P. ARMINGTON, OF WILLOUGHBY, OHIO, ASSIGNOR TO THE EUCLID CRANE & HOIST COMPANY, OF EUCLID, OHIO, A CORPORATION OF OHIO

ENDLESS TREAD LINKAGE

Application filed July 1, 1929. Serial No. 375,103.

This invention relates to tread links of strut-forming type, adapted for connection to form an endless tread linkage which may be trained over a pair of idler wheels for supporting a vehicle, and wherein the stretches between the wheels will act as beams so that a large bearing surface for the vehicle is provided. More particularly the invention pertains to a link type wherein the beam-forming portions comprise complementary hook and arch members.

An object of the invention is to provide such a link which shall function with the highest efficiency over the longest period; and to this end I so proportion the various parts of the link that the wear will be equalized and the stresses provided for in the most direct manner possible; and all in a link having maximum strength for minimum weight.

A further object of the invention is to provide such a link which shall be self-cleaning in its operation; all as will later appear.

The exact nature of this invention together with further objects and advantages thereof will be apparent from the following description taken in connection with the accompanying drawings in which Fig. 1 is a plan view of a link embodying the various features of my invention; Fig. 2 is an end view of the same which merely for convenience may hereinafter be considered as the rear end of the link, although in fact the link will function as well in either direction; Fig. 3 is a side elevation of the same link; Fig. 4 is a partial end elevation of the link, being from the forward end as distinguished from the rearward end shown in Fig. 2; Figs. 5 and 6 are sections in the horizontal planes of lines 5—5 and 6—6 respectively, Fig. 3; Fig. 7 is a sectional elevation in the central longitudinal plane of the link as in the vertical plane of lines 7—7, Figs. 5 and 6; and Fig. 8 is a side elevation of a portion of a linkage made up of links identical with that of the other figures of the drawings, parts being broken away to show details of construction, and the relative position of a cooperating vehicle wheel being indicated in broken lines.

With reference now to the drawings, the lowermost portion of the tread link, in ground-engaging position which position the link may for the present be considered as occupying, is a generally rectangular ground-engaging plate 1 which may preferably have the slight curvature indicated. About the periphery of the plate 1 are the walls indicated, upstanding a short distance. The side walls 2 join at their upper extremities horizontal rail plates 3 spaced from and parallel with the ground-engaging or bottom plate 1. The side walls 2 may have the cored openings 4, dictated by foundry practice. The end walls 5 close the ends of the spaces between the rail plates 3 and the bottom plate 1.

Extending longitudinally of the end walls 5 are a number of hinge-pin-receiving lugs arranged in staggered relation and of vertical dimension such that their lower extremities form continuations of the bottom plate 1 while their upper extremities form continuations of or are in the plane of the rail plates 3. As shown, three such hinge lugs 6, 7 and 8 are provided on the forward end of the link, the lug 7 being centrally located and the lugs 6 and 8 spaced therefrom as in line with the rail plates 3; and two hinge lugs 9 and 10 are provided on the rearward end of the link.

Preferably longitudinaly extending ribs 2a, as indicated in Figs. 5 and 6, are arranged parallel with the walls 2 and between the end lugs on the opposite ends of the link. Likewise a transverse rib 1a may extend between the side walls 2; all of these ribs upstanding from the bottom plate 1 for the purpose of strengthening the same.

The lugs on either end of the link are provided with aligned openings 11; and it will be appreciated that the arrangement is such that a number of similar links may be connected by insertion of hinge pins in the openings 11, to form an endless linkage. The hinge lugs preferably are provided at their free ends with pads 12.

What has thus far been described comprises generally the shoe portion of the link. Upstanding from this shoe portion are beam-forming portions comprising generally complementary hook and arch members 13 and 14 respectively.

The hook member 13 comprises a pair of longitudinally extending side walls 15 each leading upwardly from a side face of the central hinge lug 7, extending rearwardly to join the hinge lugs 9 and 10 as indicated in Figs. 5, 6 and 7, and extending forwardly and upwardly to overhang the shoe portion of the link. The walls 15 are joined at their forward extremities with an end wall 16, and at their upper extremities by a top wall 17 which overhangs the side walls 15 forming laterally extending flange portions 17a. The outer extremity of the hook member 13 comprises the hook proper 18 having a flat face 19 which comprises an extension of the top wall 17. Webs 20 extend laterally as indicated, and between the hook proper and the walls 15, to strengthen the hook, the webs 20 being in continuation of the end wall 16. The top wall 17 is cylindrically concentric with the openings 11 in the hinge lugs 6, 7 and 8 and the face 19 is in an axial plane thereof.

Adjacent the outer lateral extremities of the hinge lugs 9 and 10, and the inner extremities of the hinge lugs 6 and 8, are a pair of upstanding longitudinally extending walls 21. These walls are generally perpendicular of the shoe portion of the link but converge slightly upwards, above a relatively short base portion at which they are parallel. The edges of these walls are generally perpendicular also. The forward edges are joined by transverse wall portions 22 with the rearward portion of the hook member 13; and the rearward edges of these walls 21 have inwardly turned strengthening flanges 23. At their upper extremities the walls 21 are joined by a canopy web 24 which is cylindrical about the axis of the openings 11 in the hinge lugs 9 and 10, and joins the top wall 17 of the hook member and likewise the transverse walls 22 as a continuation thereof.

The wall 24 terminates in an inwardly turned lip 25 which extends laterally between the side walls 21 of the arch member. The inner face 26 of the lip 25 is parallel with the face 19 of the hook member, and lies in a plane which passes through the axis of the canopy 24. The outer face 28 of the lip 25 is curved as indicated in Fig. 7 or may be chamfered off to provide transverse faces approximating such curvature, as indicated in Figs. 2 and 3; at any rate this face is generally convex in transverse (longitudinal of the link) section; forming in said section, an arc of which the inner face 26 is approximately or parallel to the chord.

It will be apparent from Figs. 1 and 2 that an opening or arch is formed between the flanges 23 and between the lip 25 and the tread portion of the link; and that this opening is adapted to receive the hook portion 13 of a similar link. Likewise the arrangement and proportion of the parts is such that when these similar links are joined together by a hinge pin passing through their corresponding openings 11, relative motion of the links about this hinge pin will be limited in one direction by the engagement of the faces 19 and 26, one of each link. On the other hand the links may have relative motion from such engaging position up to the limit of clearance of the hook member of the one link within the arch member of the other link. It will be noted that the portions of the side walls 15 of the hook member extending between the side walls 21 of the arch member thereof, are stepped down as at 15a to provide for a maximum of such swing.

In Fig. 8 is indicated a tread linkage of a number of links such as that described, showing upper and lower stretches of the linkage with a bend therebetween as about an idler wheel 27 indicated in dot-dash lines, the wheel having a pair of tires upon which the rail plates 3 of the linkage may bear as they pass about the wheel. It will be apparent that, while the linkage may freely bend about the wheel, yet the stretches of the linkage, by virtue of the hook and arch members, form beams inflexible inwardly.

It will also appear that as any pair of links move from the stretch of the linkage onto the bend thereof, their arch members close together at their inner or free extremities. As such closure is effected the curved adjacent outer faces 24 and 28 close upon each other with a cam effect which results in a squeezing action upon extraneous matter such as accumulated dirt, therebetween; such matter being prevented entrance within the arch portions of the links before such closure is effected, by the top wall 17 of the corresponding hook member.

It will also be noted that in the bend of the linkage clearance is had between the arch members of adjacent links at their bases as indicated at A. The strength of the parts at this location is amply sufficient to crush stones or the like jammed therebetween, but the described clearance is essential for relief of the crushed particles, which are prevented from finding their way inward into the linkage by the side walls 15 of the hook members. The transverse walls 22 of the links are provided with openings 29 whereby matter which does find its way within the linkage may find exit by way of the clearances A.

The side walls 21 of the arch members are provided with openings 30 adjacent the joinder of the canopy 24 and the lip 25; so that lateral exit may be had for matter accumulated in the pocket formed by the canopy and lip and side walls of the arch member. Such exit is had only from the upper stretches of the linkage, and this exit being lateral, matter finding its way through the openings 30 will not drop onto the lower stretch, but rather clear thereof.

The side walls 15 and 21 may be provided with openings 31 and 32 respectively for the purpose of lightening the casting, it being apparent that the described parts which form the link, are integral.

While the faces 19 and 26 have been described as parallel, in which case the stretches of the linkage will be straight, if either of these faces be cast slightly closer to the other, the stretches of the linkage will be slightly curved outwardly as indicated in Fig. 8 which is a preferable arrangement in many applications.

It will be noted that these faces are spaced as far from the openings 11 as possible and have maximum transverse dimensions with minimum vertical dimension. In fact these surface areas are equal to the projected bearing areas of the corresponding openings 11; which represents the ultimate in equalization of strength and wear.

What I claim is:

1. In a tread link of the class described and having a ground-engaging shoe portion with hinge lugs extending from its ends, and beam-forming portions extending upwardly and comprising hook and arch members, whereby an endless tread may be formed of a number of said links connected by hinge pins, said tread having bends and beam-forming stretches, the hook and arch members of said link having longitudinal side walls, the walls of the hook member being offset from those of the arch member whereby the hook of each link of said tread may extend between the side walls of the arch of the adjacent link, the side walls of the hook member extending within the arch member and to the hinge-pin-receiving lugs upon the opposite end of the shoe.

2. In a tread link of the class described having a ground-engaging shoe portion, hinge lugs extending from its ends and beam-forming portions extending upwardly and comprising hook and arch members, whereby an endless tread may be formed of a number of said links connected by hinge pins and said tread may have bends and beam-forming stretches, the arch member having a pair of spaced longitudinal walls, the hook member having a wall in a plane therebetween and extending within the arch member and to a hinge pin receiving lug therebeyond.

In testimony whereof I hereby affix my signature.

ARTHUR P. ARMINGTON.